(12) United States Patent
Marengo et al.

(10) Patent No.: US 8,162,652 B2
(45) Date of Patent: Apr. 24, 2012

(54) DIAPHRAGM FORMING

(75) Inventors: Giovanni Antonio Marengo, Isle of Wight (GB); Paul Michael Roberts, Southampton (GB); Jonathan Moram, Isle of Wight (GB)

(73) Assignee: GKN Aerospace Services Limited, Isle of Wight (GB)

( * ) Notice: Subject to any disclaimer, the term of this patent is extended or adjusted under 35 U.S.C. 154(b) by 0 days.

(21) Appl. No.: 12/743,344

(22) PCT Filed: Nov. 18, 2008

(86) PCT No.: PCT/GB2008/003877
§ 371 (c)(1),
(2), (4) Date: May 17, 2010

(87) PCT Pub. No.: WO2009/066064
PCT Pub. Date: May 28, 2009

(65) Prior Publication Data
US 2010/0269978 A1  Oct. 28, 2010

(30) Foreign Application Priority Data
Nov. 20, 2007  (GB) .................................. 0722761.4

(51) Int. Cl.
*B29C 59/00*  (2006.01)
(52) U.S. Cl. ........ 425/389; 425/503; 425/504; 156/212; 156/285; 264/511; 264/529; 264/530; 264/547; 264/553; 264/554; 264/571
(58) Field of Classification Search .................. 156/212, 156/213, 285, 500, 229, 160; 264/46.8, 553, 264/511, 265, 154, 510, 225, 258, 571, 161, 264/266, 566, 568, 101, 529, 530, 547, 554; 425/389, 390, 388, 503, 504
See application file for complete search history.

(56) References Cited

U.S. PATENT DOCUMENTS

| | | | | | |
|---|---|---|---|---|---|
| 3,817,806 | A | * | 6/1974 | Anderson et al. ............. | 156/161 |
| 4,702,877 | A | * | 10/1987 | Davis, Jr. ..................... | 264/553 |
| 2003/0146543 | A1 | * | 8/2003 | Lebrun et al. ................ | 264/313 |
| 2004/0094986 | A1 | | 5/2004 | Landvik et al. | |
| 2006/0118985 | A1 | * | 6/2006 | Beck et al. ................... | 264/46.8 |

FOREIGN PATENT DOCUMENTS

| | | | |
|---|---|---|---|
| EP | 0 445 992 | A1 | 3/1991 |
| EP | 1 666 231 | A1 | 3/2004 |
| JP | 3297623 | A | 12/1991 |
| JP | 6143450 | A | 5/1994 |
| WO | 00/71329 | | 11/2000 |
| WO | 2007/088495 | A1 | 8/2007 |
| WO | WO 2007088495 | A1 * | 8/2007 |

OTHER PUBLICATIONS

International Search Report and Written Opinion under date of mailing of May 8, 2009 in connection with PCT/GB2008/003877.
International Preliminary Report on Patentability under date of mailing of Feb. 19, 2010 in connection with PCT/GB2008/003877.

* cited by examiner

*Primary Examiner* — Christopher Schatz
(74) *Attorney, Agent, or Firm* — Quarles & Brady LLP

(57) ABSTRACT

A forming tool (100) for and a method of making a three dimensional composite component using double diaphragm forming. The forming tool (100) comprises a forming side having two or more regions of changing profile and one or more through holes associated with each region, the through holes exit on the forming side and are connectable to one or more vacuum sources such that vacuum can be selectively and discretely applied to each region.

8 Claims, 5 Drawing Sheets

DIAPHRAGM FORMING

CROSS REFERENCE TO RELATED APPLICATIONS

This application represents the national stage application of International Application PCT/GB2008/003877 filed 18 Nov. 2008, which claims priority of Great Britain Patent Application No. 0722761.4 filed 20 Nov. 2007, which are incorporated herein by reference in their entirety for all purposes.

FIELD

The invention relates to forming a preform of composite material into a three dimensional component, and more particularly to a forming tool and method of making the three dimensional component using double diaphragm forming.

BACKGROUND

Single and double diaphragm forming are known techniques for making three dimensional components from a flat stack of composite material. During the diaphragm forming process the blank or composite stack is gradually shaped to take the form of an underlying forming tool whilst applying heat and pressure to the composite stack. Under the forming condition of applied heat and pressure interlaminar slip of the layers making up the composite stack allows the composite stack to take up the shape of the underlying tool with a minimum of fibre buckling or breakage. In double diaphragm forming a blank or composite stack is placed between two stretchable diaphragms of superplastic aluminium or polyimide film.

It is known to use double diaphragm forming with a solid male tool to produce composite parts that have a maximum of two radii of curvature. Such an example is illustrated in FIGS. 1A and 1B, wherein the solid male tool 1 has a substantially rectangular cross-section and the formed composite (as shown in FIG. 1B) is a channel 5 that is C-shaped.

FIG. 1A shows an example of a solid tool 1 with a flat stack of composite laminate 3 suspended above it. In the illustrated example, the composite material is suspended between two flexible diaphragms 3A, 3B to form a diaphragm pack. Air is evacuated from the diaphragm pack and it is heated before lowering the diaphragm pack onto the forming tool 1 such that it makes contact with the periphery of the tool. A vacuum is applied within the double diaphragm forming apparatus to the underside of the lower diaphragm 3A and the force of the atmospheric pressure bearing down on the upper diaphragm causes the diaphragm pack to grip on the periphery of the tool 1 so that the composite stack 3 is deformed to the shape of the tool 1 to produce a C-shaped channel 5 as illustrated in FIG. 1B.

In the example illustrated the forming tool includes two radii of curvature, each being provided between the horizontal face and the vertical faces of the forming tool.

U.S. Pat. No. 5,648,109 describes an example of using diaphragm forming to produce shapes of double curvature whilst preventing one of the diaphragms becoming trapped between the formed article and the forming tool. The diaphragm that could be trapped is withdrawn whilst the preform is brought into contact with the forming tool. Control of deformation of the preform into the shape of the forming tool may be achieved by using an inflatable member and utilises inflation and deflation of the members to allow the preform to move into contact with and take the shape of the forming tool in a controlled manner.

SUMMARY

The present invention is directed to an apparatus for producing a three dimensional composite component using double diaphragm forming comprising a forming tool and two or more vacuum bags. The forming tool comprises a forming side having two or more regions of changing profile and one or more through holes associated with each region. The through holes exit on the forming side and are connectable to respective ones of the vacuum bags thereby to connect each vacuum bag with a corresponding one of the two or more regions of changing profile for vacuum supplied from one or more vacuum sources to be selectively and discretely applied to each region.

By selectively and discretely applying a vacuum to each of the regions of changing profile sections of the composite stack can be controllably drawn towards the forming tool to produce a composite structure having the shape of the forming tool. The controlled deformation of regions of the composite material means that any stretching, thinning and tearing of the laminate that would result from uniform and simultaneous application of vacuum is reduced or eliminated. The controlled application of vacuum in selected and discrete regions means that the composite material in those regions alone is drawn towards the tool. In one example, the sequence in which vacuum may be applied is first to draw material into contact with the top and centre regions of the forming tool, in particular those regions where there are low or concave regions on the forming side of the tool such that the material is drawn into contact with the forming tool in those regions before being drawn into contact with regions that might be higher or regions that might be lower but that are positioned more towards the periphery of the tool. Therefore, in this example the final stage of forming is where the material is drawn against the periphery of the forming tool. One approach could be to apply vacuum in sequence from the centre of the tool towards the periphery. If vacuum is applied first to the periphery the material could be tightened against the tool and any subsequent deformation to take up the shape of the lower regions or the central regions of the forming tool could result in the material having to stretch to take up the shape of the forming tool. Any stretching of the material would most likely result in localised thinning and/or tearing of the composite material. The principle is therefore that the forming material should be drawn into concave areas on the forming side of the tool in a sequence that makes the overall forming process achievable whilst minimising stretching, thinning and tearing of the laminate.

Where the through holes extend through the tool from the forming side to the opposite side of the tool, channels may be provided on the opposite (underside) of the tool. The number of channels may correspond in number to the regions of changing profile on the forming side. Each channel may be configured to correspond with a zone that is specific to the changing profile on the forming side of the forming tool. By arranging the vacuum ports in channels, uniform and simultaneous application of vacuum can be applied in a controlled manner and across a selected area of the forming tool. A number of channels may be incorporated into the forming tool depending on the complexity of the shape required.

Vacuum may be applied via each of the channels in sequence to minimise stretching, thinning and tearing of the composite material.

BRIEF DESCRIPTION OF THE DRAWINGS

Embodiments of the present invention will now be described by way of example only with reference to the accompanying drawings in which.

Figure 1A:
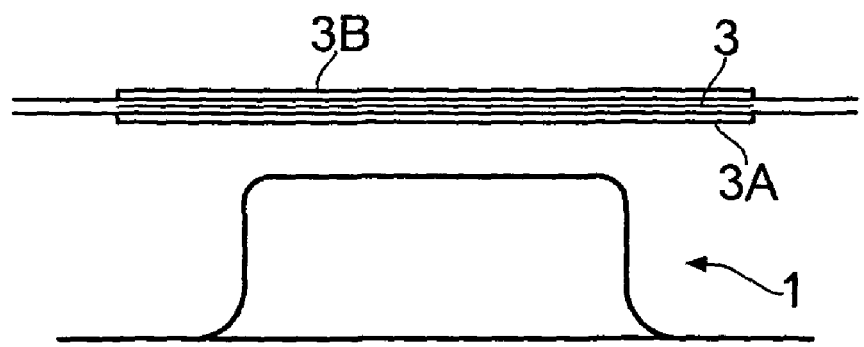
FIG. 1A is a schematic representation of a known forming tool used to produce a C-shaped channel from composite material.
Figure 1B:
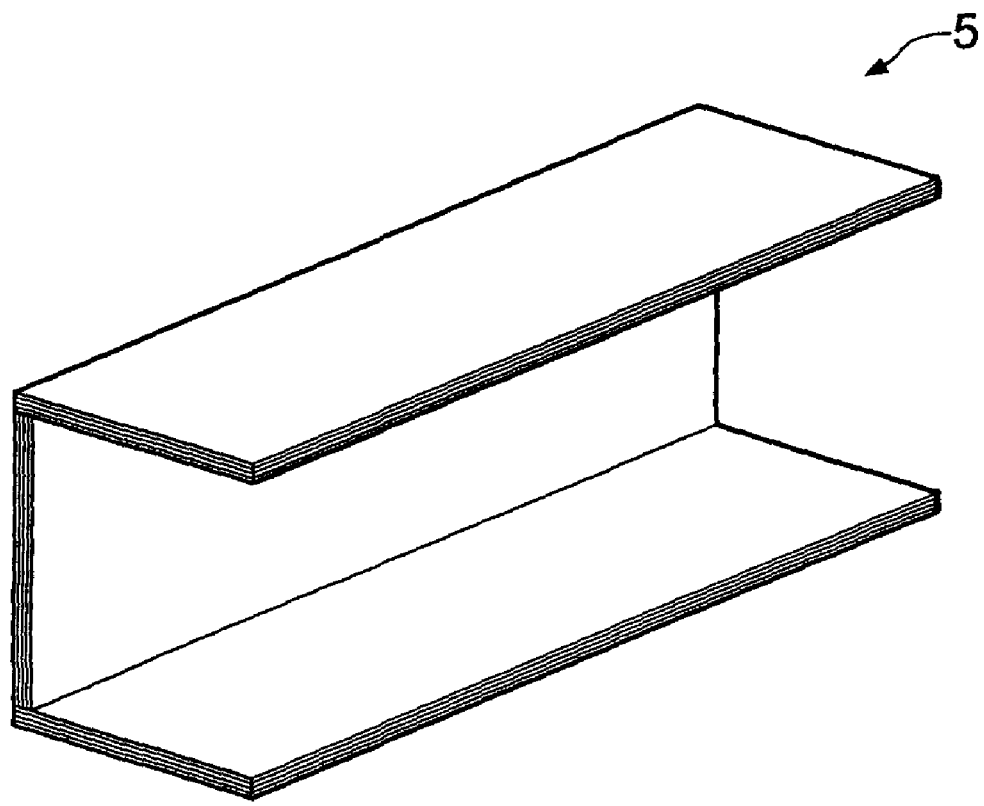
FIG. 1B shows a perspective view of the C-shaped channel formed on the tool illustrated in FIG. 1A.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the claimed invention.

DETAILED DESCRIPTION

Figure 2A:
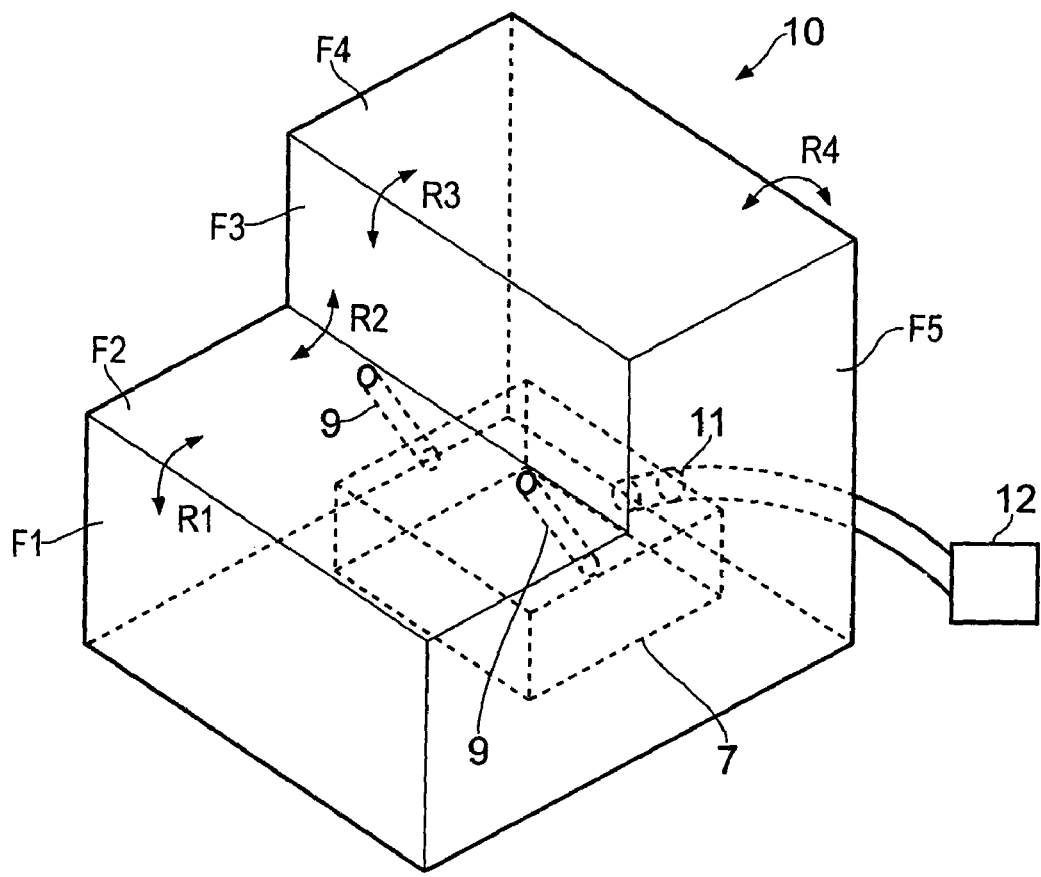
FIG. 2A shows a perspective view of a forming tool relating to an embodiment of the invention where the forming side comprises a single raised section.

FIG. 2A shows a perspective view of a forming tool 10 suitable for producing a three dimensional composite component using double diaphragm forming. The forming tool 10 is box-shaped with a corner removed so that the forming side of the tool 10 includes two horizontal surfaces F2, F4 and three vertical surfaces F1, F3, F5 defined by three external radii R1, R3, R4 and an internal radius R2 to which a composite stack can be applied and shaped.

Figure 2B:
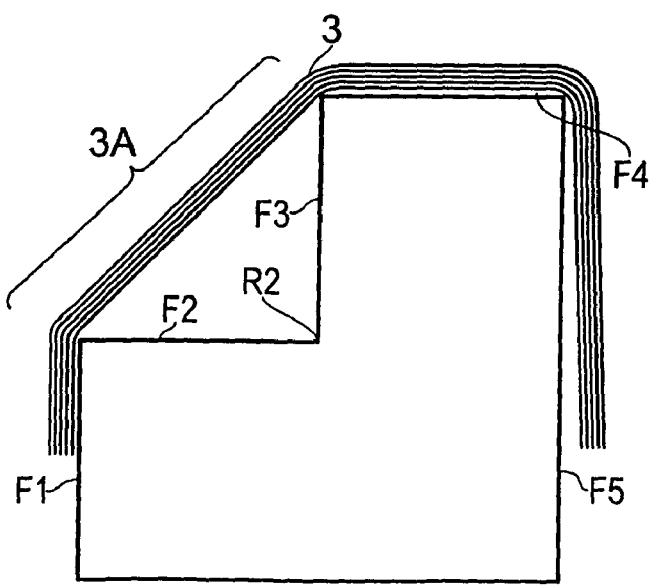
FIG. 2B shows a front view of the tool of FIG. 2A with composite material draped over the forming side of the tool.

The illustrated example represents relatively simple geometry. However, the changing profile on the forming side of the tool 10 can be problematic because as illustrated in FIG. 2B the composite material first makes contact with any raised surfaces F4 and the peripheral surfaces F1, F5 of the forming tool during simultaneous application of vacuum (diaphragm forming usually involves heating the composite material and then simultaneous application of vacuum across the whole of the composite material to change the shape of the composite material from a flat stack to the shape of the forming side of an underlying tool). Referring to FIG. 2B, it is apparent that in this example the composite material 3 makes contact with the uppermost horizontal surface F4 and the peripheral vertical surfaces F1, F5 and drapes across the cut-out section. By simultaneously applying a vacuum across the tool 10 and the material 3, the material 3 would first be drawn against the uppermost horizontal surface F4 and the two peripheral vertical surfaces F1, F5 before being drawn into contact with the surfaces F2, F3 and radius R2 forming the cut-out section. It will be appreciated that the material extending across the cut-out section is taut when the material is drawn against the raised and peripheral surfaces F4, F1, F5. Therefore, in order for the composite material 3A in the region of the cut out section to be drawn towards the faces F2, F3 and the junction R2 defined by the mating edges of the two faces F2, F3 the composite material 3A will need to stretch to take up the shape. Stretching the material may cause thinning and/or tearing of the composite material 3A in that region. Stretching, thinning and/or tearing of the composite material would result in a structural component having inferior structural properties than those intended.

Referring to FIG. 2A, to address the problem of stretching, thinning and/or tearing the forming tool 10 is adapted by introducing a cavity 7 (shown in dashed lines) on the underside of the tool and by adding vacuum ports 9 that extend through the forming tool 10 from the cavity 7 and exit on the forming side of the forming tool 10 in the region of the inner radius R2 defined by the junction of the lower horizontal forming surface F2 and the vertical surface F3 of the cut-out section. In the example illustrated, a vacuum bag that includes an outlet hose 11 for evacuating air from the system is attached to the cavity 7. The vacuum bag is provided by covering the cavity 7 on the underside of the tool 10 with, for example, a piece of bagging film and attaching it around the periphery of the cavity 7 to provide an airtight seal such that the cavity 7 is isolated from the surroundings and such that vacuum can be applied to the bagged region only. The outlet hose 11 is connected in this example to a pump 12 that allows a vacuum to be applied to the composite material via the forming tool 10 such that the material 3A in the region of the cut-out section can be drawn into contact with the surfaces F2, F3 and the inner radius R2 defining the cut-out.

In this example the forming process is carried out in two stages. Firstly, a vacuum is applied by the pump 12 drawing air through the vacuum ports 9 to effect drawing the composite material 3A into contact with the inner radius R2 and towards the vertical surface F3 of the cut-out section and towards the lowermost horizontal surface F2 of the forming tool 10. Secondly, a vacuum is applied across the whole of the forming tool 10 and the material 3 via a vacuum bed (not illustrated) of the double diaphragm forming apparatus (DDF) to complete the forming process by drawing the composite material 3 into contact with the remaining surfaces F1, F2, F3, F4, F5 on the forming side of the forming tool 10 such that a composite component having the same cross-sectional shape as the forming tool 10 is produced.

To maintain the integrity of the composite material formed into a complex composite shape having multiple curvatures as demonstrated above with regard to FIG. 2A and FIG. 2B the complex shape can be produced by selectively and discretely applying vacuum in an appropriate sequence to specific areas of the forming tool. In the illustrated example this is achieved by applying vacuum first to the recessed (lowest) region on the forming side before applying vacuum across the whole of the tool 10 to complete the forming process.

Figure 3A:
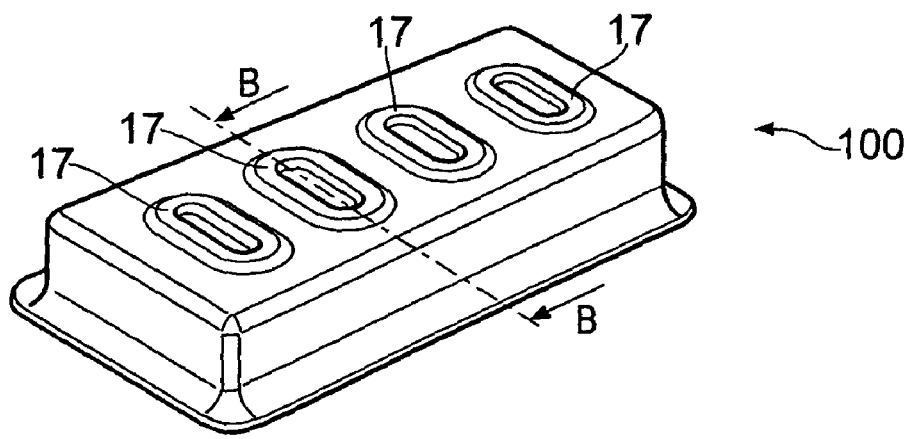
FIG. 3A shows a perspective view of a solid forming tool comprising multiple raised sections on the forming side of the tool.

FIG. 3A shows a perspective view of another example of a forming tool 100 that comprises a forming side having two or more regions of changing profile. (In this example the tool 100 is shown solid for illustrative purposes). The forming side of the tool 100 includes four raised sections 17. Each raised section 17 surrounds and provides a lip 17 around a respective oval-shaped area. In the end product (after the composite component is formed and cured) the lip 17 acts as reinforcement around oval-shaped holes that are provided by removing the composite material from the area that is surrounded by each lip 17.

Figure 3B:
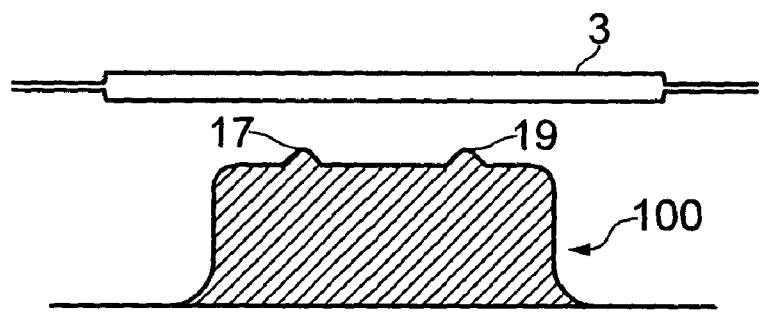
FIG. 3B shows a cross-sectional view of the forming tool of FIG. 3A to illustrate the changing profile on the forming side of the forming tool.
Figure 3C:
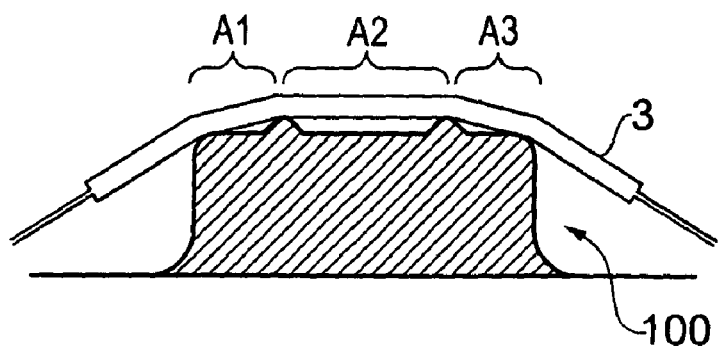
FIG. 3C shows a cross-sectional view of the forming tool of FIG. 3A with composite material draped over the forming side of the tool.

FIGS. 3B and 3C show in cross-section the forming tool 100 (taken about B-B in FIG. 3A) to illustrate the changing profile on the forming side of the forming tool and to demonstrates in which regions A1, A2, A3 the composite material that is draped across the surface of the forming tool may be subject to stretching, thinning and/or tearing if vacuum was applied simultaneously across the whole of the forming tool 100.

Figure 4B:
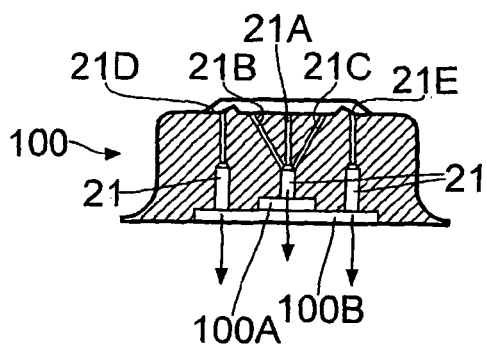
FIG. 4B shows in cross-section the forming tool of FIG. 4A taken about section D-D and illustrates the arrangement of the vacuum ports extending through the forming tool.
Figure 4A:
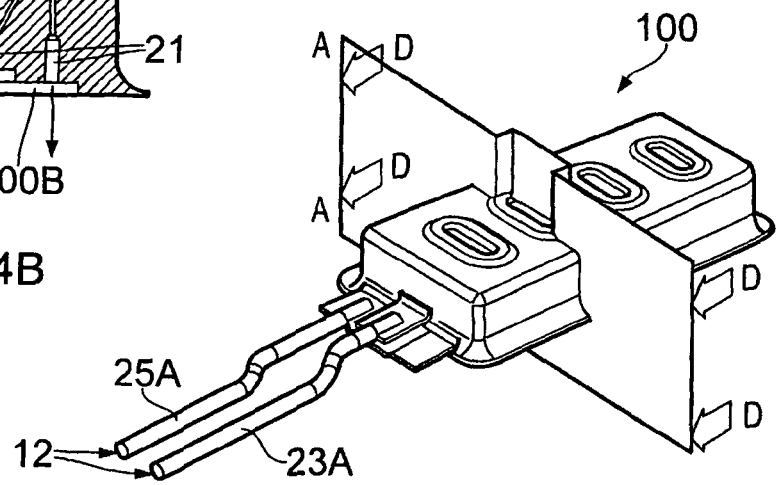
FIG. 4A shows a perspective view of an adapted forming tool having the same shape as that illustrated in FIGS. 3A to 3C and comprising a plurality of vacuum ports that exit on the forming side of the tool.

FIG. 4A shows a perspective view of a forming tool 100 having the same changing profile as the example illustrated in FIGS. 3A to 3C and where the forming tool has been adapted to include vacuum tubes 23A, 25A extending from one end of the tool 100 and exit holes on the forming side that connect the vacuum tubes 23A, 25A to discrete regions on the forming side of the tool (this feature is discussed further in view of FIGS. 4B to 4E). Reference numeral 12 is used to indicate that the vacuum tubes may be connected to a pump 12 that facilitates drawing the material towards the surface of the forming tool 100.

Referring to FIGS. 4B to 4E, in the illustrated example, a number of through holes extend from the underside of the forming tool 100 and exit on the forming side. The through holes each provide a vacuum port 21 via which vacuum can be applied to the composite material to draw it against the forming side of the forming tool 100. The vacuum ports can each be connected to a pump 12. In cross-section (see FIG. 4B) the vacuum ports 21 are arranged to provide five exit points 21A, 21B, 21C, 21D, 21E on the forming side of the forming tool 100. The exit points 21A, 21B, 21C, 21D, 21E are arranged in the region of the oval shaped flat portion and the surrounding lip 17. Three of the exit points 21A, 21B, 21C extend from one vacuum port 21, which in the illustrated example is located in an inner channel 100A and are arranged on the inside of the lip 17. On the inside of the lip 17 one exit point 21A is located substantially in the centre of the oval section and the others 21B, 21C are arranged such that they are directed towards the junction defined between the oval-shaped section and the inside of the lip 17. The central exit point 21A (when viewed in cross-section in FIG. 4B) is associated with drawing composite material into contact with the flat oval section and the other two vacuum ports 21B, 21C are associated with drawing composite material into the inner radii defined by the junction between the flat oval section and the inside of the lip 17.

The remaining two exit points 21D, 21E extend from a respective vacuum port 21 that is arranged on the outside of the lip 17. These outer exit points 21D, 21E are directed towards the junction of the outside of the lip 17 and the flat sections of the forming tool 100 towards the periphery of the tool 100 and the flat sections between the lips 17. The outer exit points 21D, 21E are associated with drawing composite material into contact with the radius defined by the junction of the lip 17 and the top of the forming tool 100 towards the periphery and between the lips 17. It will be appreciated that the exit points 21A, 21B, 21C, 21D, 21E are all arranged to open onto the forming side of the forming tool in regions that represent a change in profile on the forming side of the tool 100.

Figure 4C:
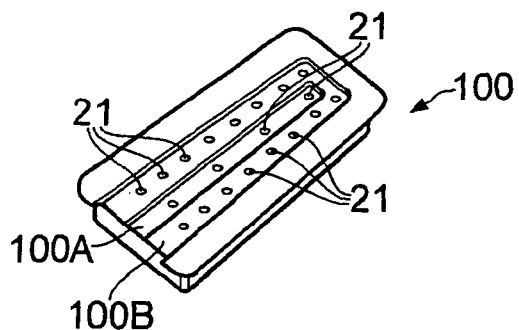
FIG. 4C shows a perspective view of the forming tool of FIGS. 4A and 4B showing the underside of the forming tool.
Figure 4D:
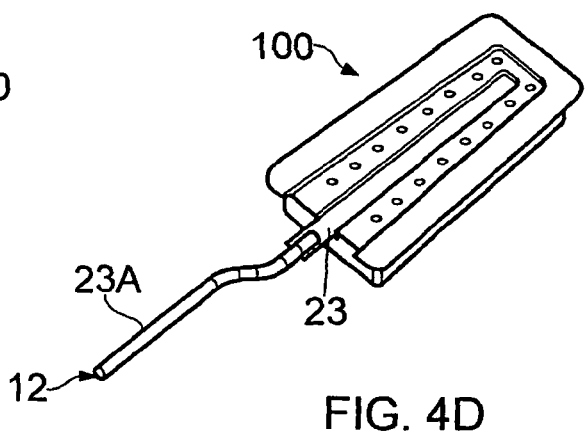
FIG. 4D shows a perspective view of the tool in FIG. 4C with a vacuum bag attached to an inner channel.
Figure 4E:
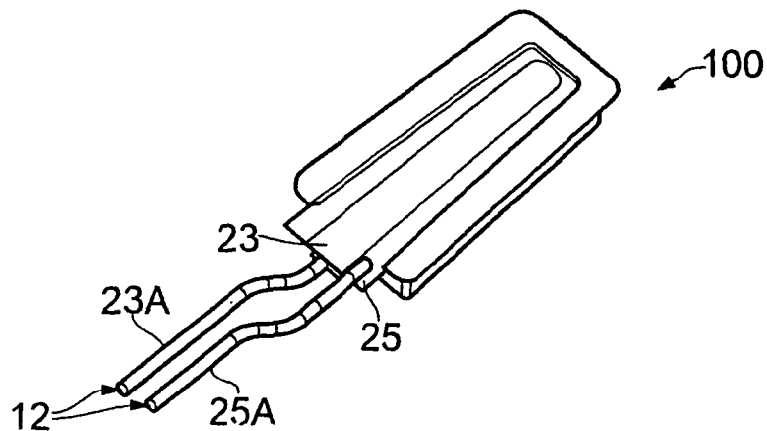
FIG. 4E shows a perspective view of the tool in FIG. 4C with a vacuum bag attached to an outer channel.

FIGS. 4C, 4D and 4E each illustrate a perspective view of the underside of the forming tool 100.

In the example illustrated, the vacuum ports 21 are arranged on the underside of the tool 100 in two separate channels 100A, 100B cut into the body of the tool 100. The inner channel 100A is associated with the region of the forming tool 100 that corresponds with the location of the oval-shaped flats (on the inside of the lips 17) and includes a line of vacuum ports 21 each of which referring to FIG. 4B, connects with the three exit points 21A, 21B, 21C on the forming side of the forming tool 100. The outer channel 100B is associated with the junction of the lips 17 and the flat sections on the surface of the tool 100 that lie on the outside of the lips 17 and between the lips 17. The outer channel 100B includes two lines of vacuum ports 21 which are arranged one either side of the inner channel 100A.

Referring to FIG. 4D, a vacuum bag 23 and a vacuum tube 23A are attached to the inner channel 100A. The vacuum bag 23 covers the inner channel 100A and is attached to the underside of the forming tool 100 in a manner such that the inner channel 100A and the exit points 21A, 21B, 21C associated with the inner channel 100A are isolated from the outer channel 100B, the vacuum ports 21 associated with the outer channel 100B and the exit points 21D, 21E associated with the outer channel 100B. Similarly, in FIG. 4E a vacuum bag 25 and a vacuum tube 25A are connected to the outer channel 100B. The vacuum bag 25 covers the outer channel 100B and is attached to the underside of the forming tool 100 such that the outer channel 100B, the vacuum ports 21 associated with the outer channel 100B and the exit points 21D, 21E associated with the outer channel 100B are isolated from the inner channel 100A and the vacuum ports 21 and the exit points 21A, 21B, 21C associated with it.

The vacuum bags 23, 25 and vacuum tubes 23A, 25A are connected to a suitable vacuum device such as a pump and are arranged such that a vacuum can be applied selectively and discretely to a particular region via the underside of the forming tool 100 so that only the associated region of the forming side of the forming tool 100 and the corresponding region of the composite material is subject to vacuum.

For the composite material to take up the shape of the forming side of the forming tool 100 and to ensure the integrity of the composite material when it is drawn into contact with the forming tool 100 vacuum needs to be applied in an appropriate sequence. In this example, vacuum was applied in sequence to regions of the tool 100 from the centre towards the periphery.

Figure 5A:
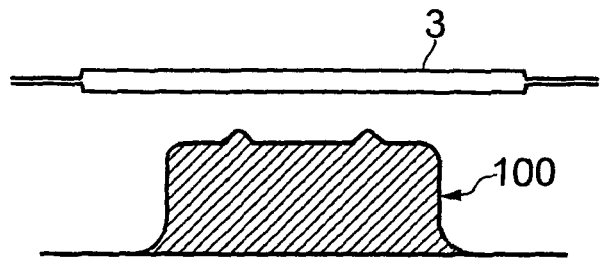
FIG. 5A shows in cross-section the forming tool of FIGS. 4A to 4E with a diaphragm pack located above the tool.
Figure 5B:
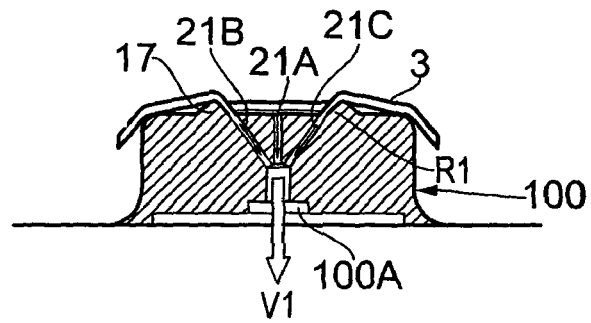
FIG. 5B shows in cross-section the forming tool of FIGS. 4A to 4E undergoing the first stage of the diaphragm forming process.
Figure 5C:
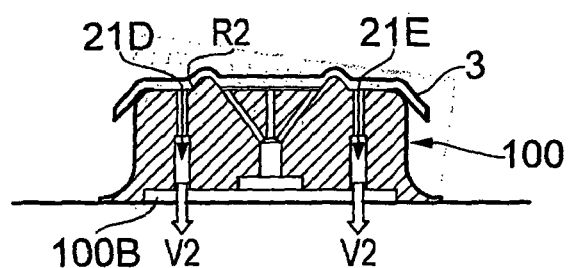
FIG. 5C shows in cross-section the forming tool of FIGS. 4A to 4E undergoing the second stage of the diaphragm forming process.
Figure 5D:
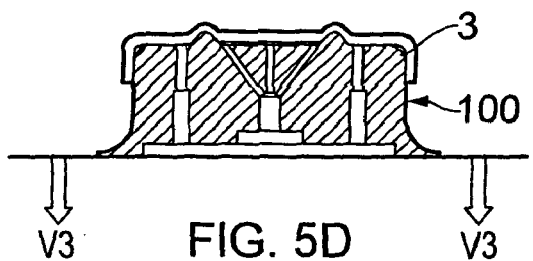
FIG. 5D shows in cross-section the forming tool of FIGS. 4A to 4E undergoing the third and final stage of the diaphragm forming process.

The sequence of steps involved in forming a composite component in the form of the forming tool 100 is illustrated in FIGS. 5A to 5E. FIG. 5A shows a diaphragm pack containing a stack of composite material 3 located above the forming tool 100 (shown in cross-section). In the illustrated example, the process of forming the composite component (as shown on top of the forming tool in FIG. 5E) is done in three stages as illustrated respectively in FIGS. 5B, 5C and 5D where vacuum is applied selectively and discretely to draw the composite material into contact with the tool 100 in a selected region to avoid unnecessary stretching, thinning and tearing.

At stage one of the forming process, a vacuum V1 (see FIG. 5B) is applied via the inside channel 100A, its associated vacuum ports 21 and the associated exit points 21A, 21B, 21C to the oval-shaped sections and the inner radii R1 of the lips 17 to draw the composite material into contact with the surface of the forming tool 100 in that selected region; namely, into contact with the flat oval section on the inside of the lips 17 and into the junction R1 defined by the inside of the lip 17 and the flat oval-shaped section.

The second stage of the forming process involves a vacuum V2 (see FIG. 5C) applied via the outer channel 100B, its associated vacuum ports 21 and its associated exit points 21D, 21E to draw the composite material 3 into contact with the raised surface defining the lip 17 and towards the radius R2 defining the junction between the lip 17 and the surface of the forming tool 100 between the lips 17 and outside of the lips 17.

Figure 5E:
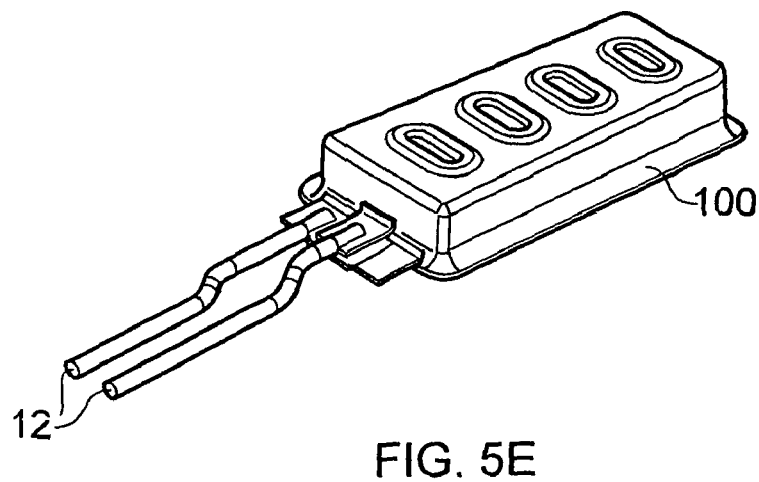
FIG. 5E shows a perspective view of the forming tool of FIGS. 4A to 4E with a composite component formed on forming side of the tool.

Finally, at the third and final stage of the forming process a vacuum V3 is applied across the whole of the forming tool 100 via, for example, a vacuum bed of the double diaphragm forming apparatus (DDF) to complete the forming process to draw the composite material 3 into contact with the flat regions between the lips 17 and onto the vertical faces of the forming tool 100 to produce the end product as illustrated on top of the forming tool 100 in FIG. 5E.

In the examples described above the changing profile on the forming side of the forming tool is divided into regions that are isolated from each other such that vacuum can be applied selectively and discretely to minimise stretching, thinning and tearing in the material forming the end product.

In the examples described conventional bagging material is used to cover associated areas on the underside of the tool. As an alternative to the bagging material an external device or a number of external devices could be attached to the vacuum ports and could be configured such that the vacuum ports associated with each region are linked in a manner such that vacuum can be applied simultaneously via the selected ports. A number of vacuum ports may be attached to a single device such that vacuum is applied simultaneously to only those ports. For example, a tube could be inserted in each vacuum port and those tubes associated with a specific area of the tool could be joined to a vacuum source, for example a pump 12 configured to connect with the number of tubes. Alternatively, a single vacuum port could be attached to a single device such that each vacuum port is isolated from all others. It will be appreciated that each single device could be operated synchronously such that vacuum is applied simultaneously to the associated region of the forming tool. The use of separate tubes or adaptors for each vacuum port allows each vacuum port or a group of vacuum ports to be isolated from the others and also allows control of where and when vacuum is applied.

In the examples described cavities or channels are used on the underside of the tool to facilitate the application of bagging material, but also to ensure that the bagging material and vacuum tubes do not affect positioning of the underside of the tool against the flat bed of the DDF apparatus.

In the examples described above, the vacuum ports are configured to extend from the underside of the tool to the forming side of the tool. However, it will be appreciated that they could be arranged to extend from the side walls of the tool and that an appropriate device or devices could be attached to the vacuum ports associated with each region in the manner described above.

In the process described above the time taken to apply a vacuum in each stage of the process can be relatively quick; for example in the order of one second. Therefore, the overall forming process to form the composite material into, for example, the complex shape as illustrated in FIGS. 5A to 5E can take only a few minutes. It will be appreciated that the time taken for the overall forming process will be dependent on the complexity of the shape to be formed.

The example illustrated in FIGS. 3A to 3C, 4A to 4E and 5A to 5E relates to forming a rib, which is a component used inside a wing of an aircraft to provide resistance to twisting forces. The oval-shaped holes that are machined after the composite material is formed and cured are "lightening holes" that are included to reduce the weight of the part. The correspondingly shaped raised lip 17 around the edge of each hole acts to reinforce the hole to ensure that the overall strength of the rib is not compromised by the presence of the holes.

It will be appreciated that the process described above is applicable to forming tools that have a shape that is more complex than those described and illustrated above. The number of channels and bags applied to the underside of the forming tool is influenced by the complexity of the shape to be formed on the forming side of the tool. Therefore, it will be appreciated that the forming process described above is not limited to three stages, but that the number of stages required to produce the final composite structure is dependent on the complexity of the shape to be formed.

An example of suitable material used in the multi-stage double diaphragm forming process as described above is one that comprises unidirectional carbon fibres pre-impregnated with a resin for example a material designated MTM44-1, which cures at a low temperature (120 deg C.) and at low pressure (atmospheric pressure).

Suitable material for making the forming tool 100 (as illustrated in FIGS. 4A to 4E and FIGS. 5A to 5E) is RAKU-TOOL® WB-0700 Epoxy board, which is a tooling material that can be, machined easily to produce complex shapes on the forming side of the forming tool 100 and can be easily machined to produce the vacuum ports and channels (if needed). RAKU-TOOL® WB-0700 Epoxy board also presents good dimensional stability and is temperature resistant up to 135 deg C.

The composite material and tooling material described above are by way of example only. It will be appreciated that other types of composite material and tooling material could be used.

The invention claimed is:

1. An apparatus for producing a three dimensional composite component using a diaphragm forming process comprising a forming tool and two or more vacuum bags, wherein the forming tool comprises a forming side having two or more regions of changing profile and one or more through holes associated with each region, the through holes exiting on the forming side and being connectable to respective ones of the vacuum bags thereby to connect each respective vacuum bag with a corresponding one of the two or more regions of changing profile for vacuum supplied from one or more vacuum sources to be selectively and discretely applied to each region, wherein the through holes extend from a side of the tool that is opposite to the forming side and the opposite side includes two or more channels, wherein each channel is associated with a corresponding region of changing profile on the forming side and a one of the respective vacuum bags is received in each channel.

2. An apparatus according to claim 1, wherein the one or more vacuum sources is attachable to the vacuum bags such that a vacuum can be selectively and discretely applied to each of the two or more regions of changing profile.

3. An apparatus according to claim 1, wherein each respective vacuum bag for each region of changing profile is connected to a corresponding single vacuum device.

4. An apparatus according to claim 1, wherein respective vacuum bags for respective regions of changing profile are connected in a group to a single vacuum device.

5. An apparatus according to claim 1, wherein at least one vacuum pump provides the one or more vacuum sources.

6. An apparatus according to claim 1, wherein the one or more vacuum sources comprise at least one pump connected to the two or more vacuum bags.

7. A method of producing a three dimensional composite component using diaphragm forming, wherein the method comprises the steps of:
applying a diaphragm pack containing composite material to the forming side of the forming tool of an apparatus according to claim 1;
connecting the through holes via the two or more vacuum bags to one or more vacuum sources;
applying heat to the diaphragm pack;
applying a vacuum selectively and discretely to each of the two or more regions between the diaphragm pack and the forming tool such that a region of the diaphragm pack to which vacuum is applied is drawn into contact with the forming side of the forming tool in a predetermined sequence to form a three dimensional component.

8. A method according to claim 7, wherein the vacuum is applied to the regions of changing profile in sequence from the centre of the forming tool towards the periphery of the forming tool.

* * * * *